United States Patent [19]

Fukagawa et al.

[11] Patent Number: 5,293,602
[45] Date of Patent: Mar. 8, 1994

[54] MULTIPROCESSOR COMPUTER SYSTEM WITH DEDICATED SYNCHRONIZING CACHE

[75] Inventors: Masakazu Fukagawa; Tadaaki Isobe, both of Hadano, Japan

[73] Assignee: Hitachi, Ltd., Tokyo, Japan

[21] Appl. No.: 647,513

[22] Filed: Jan. 28, 1991

[30] Foreign Application Priority Data

Feb. 1, 1990 [JP] Japan .................................. 2-23310

[51] Int. Cl.⁵ ............................................. G06F 13/14
[52] U.S. Cl. ................................. 395/425; 364/DIG. 1; 364/243.41
[58] Field of Search ............... 395/200, 250, 275, 400, 395/425, 600, 800, 700; 364/DIG. 1 MS File, DIG. 2 MS File

[56] References Cited

U.S. PATENT DOCUMENTS 4,488,083 12/1984 Inoue et al. ......................... 313/366
4,888,679 12/1989 Fossum et al. ..................... 395/800

*Primary Examiner*—Robert B. Harrell
*Attorney, Agent, or Firm*—Fay, Sharpe, Beall, Fagan, Minnich & McKee

[57] ABSTRACT

Disclosed is a computer system containing plural processors, a shared storage shared by the plural processors, a buffer storage for storing a copy of a portion of data of the shared storage disposed in each of the plural processors, and a storage controller having a communication buffer storage disposed halfway between the buffer storage and the shared storage for storing a copy of a portion of data of the shared storage as an object for storing only an operand data of a particular instruction. This computer system can implement communication of data of the shared storage between the plural processors by using the communication buffer storage in an efficient way.

3 Claims, 4 Drawing Sheets

MULTIPROCESSOR COMPUTER SYSTEM WITH DEDICATED SYNCHRONIZING CACHE

BACKGROUND OF THE INVENTION

The present invention relates to a computer system and, more particularly, to a computer system adapted to implement storage control in the computer system having plural processors by disposing a buffer storage in a storage controller and to efficiently communicate data of a storage shared by the plural processors.

Heretofore, a general purpose computer system having plural processors has a buffer storage disposed in each of its processors and, for example, a global buffer storage disposed between a shared storage shared by all the processors and the buffer storage, thereby showing the shared storage as if located closer when looked from the processors.

Also, a vector computer system having plural processors for implementing vector processing is so constructed as to communicate data of the storage shared by the plural processors, for example, by implementing data communication among the plural processors by means of a shared register, as disclosed in Japanese Patent Laid-open (kokai) Publication No. 60-37,064/1985 corresponding to U.S. Pat. No. 4,488,083. The data communication by the shared register can minimize overhead for implementing the multiple task processing of a small task, which accompanies frequent data exchange using a communication path between high-speed processors.

When the shared register is employed in the manner as described hereinabove, the problem arises that software to be used requires the register itself and takes the number of registers into account, so that flexibility somewhat lacks in extension of the system architecture and so on. Further, the shared register to be employed therein requires processing for saving/recovering the register upon switching the task, thereby requiring the shared register to be managed on the software side.

Further, the data communication by means of the shared register as in the known art described hereinabove does not pay any attention to reliability of the system, so that error correcting codes (ECC) are added in order to ensure reliability. Therefore, there must be taken measures to duplicate the shared register itself, and so on. However, for instance, the problems occur that the addition of the ECC reduces the throughput for ECC processing and that the duplication of the shared register increases the volume of hardware therefor.

Further, a three-layer memory architecture in the general purpose computer system with plural processors suffers from the problem of physical quantity. That is, the global buffer storage and so on should become somewhat large so as to correspond to the memory-size of the shared storage because all data is set as the object for storage in the buffer storage.

Furthermore, the computer system having the vector processor requires the vector processor to be connected to the main storage through a path of a high data throughput in order to feed a large number of data at a high speed to the vector processor. Therefore, the essential problem exists in the system configuration that there cannot be so disposed something like an intermediate buffer storage which can make the main storage look closer. In other words, the vector processor is connected to the main storage through the connection path having a high data throughout. Thus data is frequently read from and written in the buffer storage always at such a high throughput even if something like the buffer storage would be disposed between the vector processor and the main storage. Therefore, the contents of the buffer storage are always replaced, thereby constantly causing the data transfer to occur between the buffer storage and the main storage and as a result making the buffer storage no use. In summary, even if the buffer storage would be disposed, a data access time to the buffer storage may become the same as that to the main storage or longer.

As described hereinabove, the computer system having the vector processor cannot be provided with something like the intermediate buffer storage so as to have the main storage look closer in the general purpose computer system, whereby the computer system having the vector processor should cause data accompanying no vector data, such as scalar instruction, control instruction and so on, to be always made access to the main storage when data is transferred between the plural processors.

SUMMARY OF THE INVENTION

Therefore, the object of the present invention is to provide a computer system capable of carrying out efficient communication of data of a storage shared by plural processors in the computer system having the plural processors.

Another object of the present invention is to provide a computer system adapted to efficiently implement communication of the data of the storage shared by the plural processors by implementing memory control in the computer system with the vector processor by means of a buffer storage disposed in a storage controller.

In order to achieve the aforesaid objects, the computer system according to the present invention is characterized by plural processors, a shared storage shared by the plural processors, a buffer storage for copying and storing a portion of the data of the shared storage disposed in each of the plural processors, and a storage controller so disposed as to lie halfway between the buffer storage and the shared storage and as to have a communication buffer storage for copying and storing a portion of the data of the shared storage by using only an operand data of a particular instruction as an object for storage.

The term "plural processors" is intended to contain a vector processor in which no buffer storage is disposed. And the operand data other than the particular instruction such as a vector instruction is mutually supplied directly between the processor and the shared storage without being stored in the communication buffer storage disposed in the storage controller.

The shared storage is a storage shared by the plural processors, and the communication buffer storage is a buffer storage so disposed in the storage controller of the computer system having the plural processors as to copy and store a portion of the data of the shared storage by using only the operand data of the particular instruction as the object for storing. Each of the processors further has a buffer storage disposed so as to copy and store a portion of the data of the shared storage. The communication buffer storage to be disposed in the storage controller is located halfway between the buffer storage of each processor and the shared storage and it is employed as an intermediate buffer storage for storing and supplying the operand data at the time of execution of the particular instruction.

Therefore, when the communication buffer storage of the storage controller is employed by a limited particular instruction as an intermediate buffer storage upon storing a copy of the portion of the shared storage and referencing or updating the data. This arrangement can optionally choose the use of the communication buffer storage, particularly for data communication between the plural processors, thereby efficiently executing, for example, vector processing.

The communication buffer storage to be disposed between the shared storage and the buffer storage of the processor copies, stores and references the portion of the data of the shared storage by means of the particular instruction. Therefore, when data is communicated between the processors connected to the shared storage with the particular instruction, no access to the shared storage is required. And when the data is fetched in the communication buffer storage, access is made merely to the communication buffer storage, thereby shortening an access time to the desired data.

In this case, as long as access is made with the particular instruction, no data is stored in the buffer storage of either processor and only in the communication buffer storage. Therefore, as long as access is made to the data to be employed for communication between the processors by means of the particular instruction, invalidation of the data of the buffer storage in the other processor is not particularly required when the data is updated with the particular instruction, because a copy of a portion of the data of the shared storage is not stored in the buffer storage of the other processor. Further, when the data to be used for communication between the processors is employed only for referencing without updating, the data is not updated even if fetched in the buffer storage of the processor, so that invalidation is not required. Therefore, a reference request may be issued by means of a general reference instruction, thereby fetching the data in the buffer storage of each processor. In this case, when no copy of the data of the shared storage exists in the buffer storage of the processor and the copy thereof exists in the communication buffer storage upon issuance of a reference instruction other than the particular instruction from each processor, the copy of the data present in the communication buffer storage is first transferred to the buffer storage and stored therein, followed by continuing to transfer the rest of the data from the shared storage.

As described hereinabove, the disposition of the communication buffer storage enables the computer system having plural processors including the vector processor which can dispose no intermediate buffer storage in nature, to process data communication between the processors at a high speed.

DESCRIPTION OF THE PREFERRED EMBODIMENTS

Figure 1:
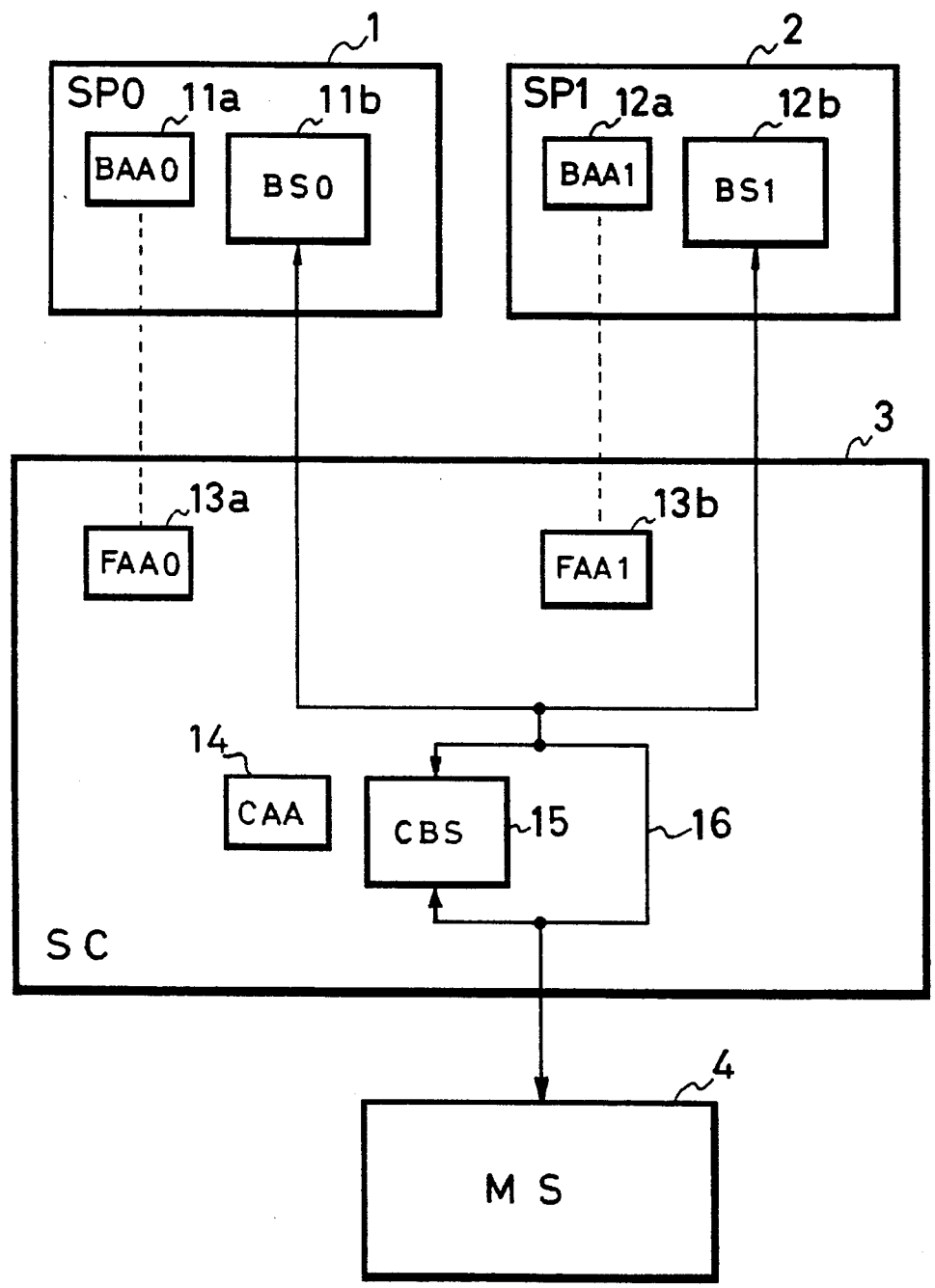
FIG. 1 is a block diagram showing the construction of a computer system according to a first embodiment of the present invention.

FIG. 1 is a block diagram showing the construction of the computer system according to the first embodiment of the present invention. In FIG. 1, reference numerals 1 and 2 stand for scalar processors (SP0 and SP1) for implementing a scalar operation of ordinary processing, reference numeral 3 for a storage controller (SC), and reference numeral 4 for a main storage (MS) shared by the scalar processors SP0 and SP1. The scalar processors 1 (SP0) and the scalar processor 2 (SP1) are provided with buffer storages 11b and 12b (BS0 and BS1) for storing a copy of data in the main storage 4 and with a first management table (Buffer Address Array: BAA0 and BAA1) 11a and 12a for managing a buffer storage for registering a MS address of a block that is a copy of the main storage MS stored in the buffer storages BS0 and BS1, respectively.

The storage controller (SC) 3 is provided with a second management table (Front Address Array: FAA0 and FAA1) 13a and 13b for managing the buffer storage for registering a copy of an entry address of the BAA0 and the BAA1 corresponding to the buffer storage BS0 and BS1, respectively, in each processor. These second management tables FAA0 and FAA1 are each a management table for checking a store address to be referenced by other processors and it is so arranged as to process an identity control between the main storage MS and the buffer storage in each of the processors at a high speed. The storage controller (SC) 3 is provided with a communication buffer storage (CBS) 15 for storing a copy of a portion of data of the main storage only for an operand of a particular instruction and further with a third management table (Communication Address Array: CAA) for registering a main storage address of a registration unit of data (operand data) that is a copy of a portion of the main storage data stored in the communication buffer storage (CBS) 15.

In the computer system in which the plural scalar processors SP shares the mains storage MS, the plural scalar processors SP are allowed to operate in an asynchronous way to implement parallel processing of MS reference necessary therefor. Hence, when the plural scalar processors SP reference data in a common area of the main storage MS, no request from any of the other processors is accepted during a series of operations of reading the data, rewriting it only when a certain condition is established on the basis of a value of the data, and re-storing it in the main storage MS, and the data after re-written by the other scalar processor should correctly be read out when the data is read from the main storage MS, in order to allow the self scalar processor SP to use the data.

In order to carry out such a series of processing, each of the scalar processors SP sends a read request for reading the data to the storage controller SC, not to the respective buffer storage BS, thereby allowing the storage controller to take the priority from the requests for such a series of operations from all the scalar processors SP and selecting only a sole request from them. Then the storage controller SC reads, overwrites and stores the data on the basis of the sole request. The request from the other scalar processor is inhibited during such a series of these processing. This processing mechanism (including the case wherein a request is inhibited which relates to an area that is the object for the series of operations and wherein all of requests are not inhibited as well) is called an "interlocking mechanism" and an instruction utilizing the interlocking mechanism may include, for example, "Test and Set" instruction for an IBM 370 series computer and "Compare and Swap" instruction and "Compare Double and Swap" instruction for an IBM 370 series computer. For instance, take the case as an example, wherein a flag of a certain area in which the main storage MS shared by the scalar processor SP0 and the scalar processor SP1 is updated by both the scalar processors SP0 and SP1 on the basis of the "Test and Set" instruction (hereinafter referred to as "TS instruction"). In this processing, the data in the main storage specified as an operand by the TS instruction is stored in the communication buffer storage CBS, not in the buffer storage BS, as data that is the object for being stored specially in the communication buffer storage CBS.

First, the third management table CAA 14 is searched upon request by the TS instruction from the scalar processor SP0, and a copy of the data from the main storage MS 4 is stored in the communication buffer storage CBS 15 in the storage controller SC 3 if the requested data would not exist in the communication buffer storage CBS 15 in the storage controller SC. In this instance, the data to be stored is an operand of the TS instruction, so that it is not stored and registered in the buffer storage BS in the scalar processor SP0. This allows subsequent reference from the communication buffer storage CBS 15. On the other hand, as the scalar processor SP1 references the data (flag) of the same area, the TS instruction is also employed. In this case, however, as the data has been already stored in the communication buffer storage CBS 15, it can be fetched from the communication for the communication buffer storage storage CBS 15. The operand of the TS instruction in this case is not fetched in the buffer storage BS in the scalar processor SP0, so that no processing such as invalidating is necessary even if the scalar processor SP1 would overwrite the data.

Figure 2:
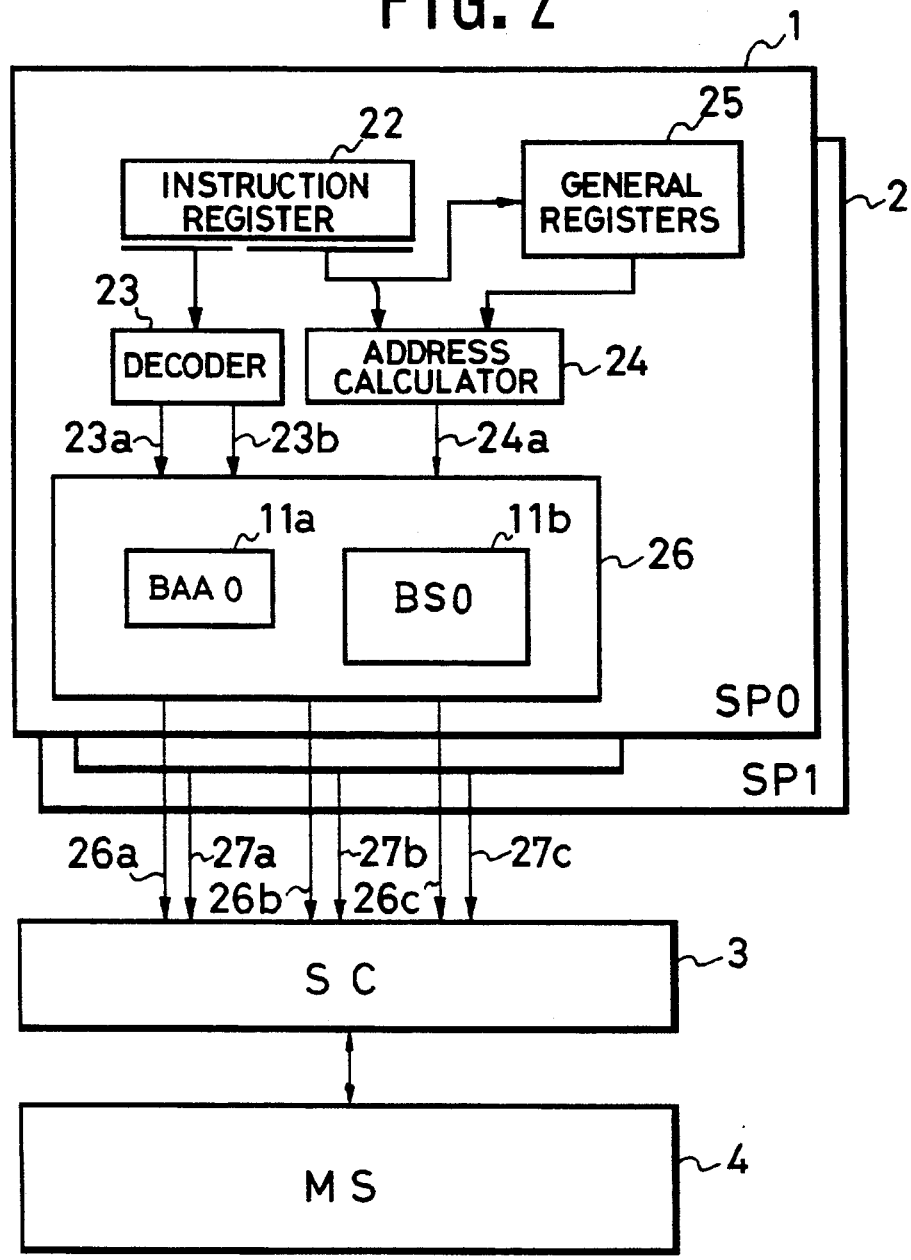
FIG. 2 is a block diagram showing the construction of the essential portion of an instruction processing of a scalar processor.

FIG. 2 is a block diagram showing the construction of the essential portion of the instruction processing of the scalar processor. As shown in FIG. 2, reference numeral 1 stands for the scalar processor SP0, reference numeral 2 for the scalar processor SP1, reference numeral 3 for the storage controller SC, reference numeral 4 for the main storage MS, reference numeral 22 for an instruction register, reference numeral 23 for a decoder of an operation code, reference numeral 24 for an address calculator, reference numeral 25 for general registers, and reference numeral 26 for a buffer storage controller.

Description will be made of an outline of the instruction processing of the scalar processor. The instruction fetched in the instruction register 22 is decoded in the decoder 23 and a processing request is issued to the buffer storage controller 26 by a decoding output line 23a when the instruction is to make the storage MS an access object. In this instance, the object address of the storage MS is specified by an address output line 24a. Further, the aforesaid TS instruction specifies a synchronization instruction by a decoding output line 23b. By making the decoding output line 23b to a high level, fetching the data present in the main storage MS is recognized directly, not from the buffer storage BS0, by the buffer storage controller 26. Therefore, the processing of the TS instruction requests to the storage controller SC 3 from a request line 26a and an address line 26c by allowing a signal line 26b to specify that the instruction is the TS instruction. Then, the storage controller SC 3 can read the data from the communication buffer storage CBS when the signal line 26b is valid (a high level). It is noted herein that the instruction processing unit of the scalar processor SP1 has substantially the same construction as the scalar processor SP0, and a request line 27a, a signal line 27b and an address line 27c are connected from the buffer storage controller 27 to the storage controller SC 3.

When the data update processing is finished between the scalar processor SP0 and the scalar processor SP1 and only the reading is implemented on the program thereafter, issuance of an access request by a usual reference instruction (other than the TS instruction) can store a copy of the buffer storage CBS in the scalar processor SP, a requestor of the request, from the communication buffer storage CBS. In this case, if the registration unit of the communication buffer storage CBS is smaller than the buffer storage BS, the data is transferred from the main storage MS to the buffer storage BS after the transfer of the copy from the communication buffer storage CBS to the buffer storage BS has been finished.

Further, when an usual main storage reference instruction (other than the TS instruction) is issued from the scalar processor SP, a copy of data in the main storage MS is transferred from the main storage MS to the buffer storage BS in the scalar processor SP that is a requestor of the request if no copy of the request data is stored in the buffer storage BS of the respective scalar processor. In this case, the copy of the data is not stored in the communication buffer storage CBS because the request is not a reference request on the basis of the TS instruction.

As described hereinabove, although the operand data is so processed as to be stored in the communication buffer storage CBS by the TS instruction, the particular instruction for implementing this processing may further include the "Compare and Swap" instruction and the "Compare Double and Swap" instruction as well as the TS instruction, and the operand can be processed in substantially the same as the aforesaid processing.

The aforesaid processing operation is processing operation for making access to the main storage MS at a high speed by making the operand data access to the communication buffer storage CBS as long as the instruction processing is to be implemented by the interlocking mechanism. It can be noted herein that a new instruction for making access particularly to the communication buffer storage CBS may separately be disposed.

For instance, when there is issued an LCBS instruction for loading by using the communication buffer storage CBS as the access object or a STCBS instruction for an instruction for storing by using the communication buffer storage as the access object, a copy of the data is transferred from the main storage MS and stored in the communication buffer storage CBS if no object operand exists in the communication buffer storage CBS. In particular, if the copy of a block on the main storage MS containing the data is not yet stored in the communication buffer storage when the data is stored in both of the main storage MS and the communication buffer storage CBS, the copy of the block on the main storage MS is stored in the communication buffer storage CBS.

Unlike issuance of a usual load instruction or store instruction by each of the scalar processors, the use of the LCBS instruction and the STCBS instruction upon referencing the data for transferring between the processors presents the advantage that no data is fetched in the buffer storage in each processor. If the data is not fetched in each of the buffer storages as described hereinabove, invalidation of the contents of the buffer storage in the other processor is not required even when the contents of the data has been overwritten upon implementation of a series of processing in mutual association with the plural processors.

The instruction for storing in both of the buffer storage BS in the processor and the communication buffer storage CBS is a variable synchronous with the other processor, like the LCBS instruction. And this store instruction is valid when used at the time of finishing a series of the processing for communication with the other processor because this is an instruction for causing no invalidation processing even when data is fetched in the buffer storage in the self processor as long as the data is not erased in the other processor.

Figure 3:
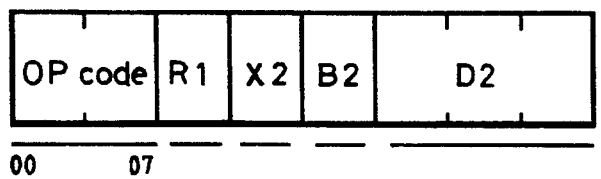
FIG. 3 is a diagrammatic representation of an embodiment of an instruction format of LCBS instruction and STCBS instruction.

FIG. 3 is a diagrammatic representation of an example of the instruction format of the LCBS instruction and the STCBS instruction. As shown in FIG. 3, the instruction format is of such a type that an operand address is given by adding the content stored in a general register as shown as X2 and B2 to the content existing in D2 and that the content of the main storage MS indicated by the operand address is stored in the general register as shown in R1. In the computer architecture in this embodiment, for example, when the content of the R1 is set to "0", the content of the main storage MS is not stored in the general register of the 0th address and a copy of the content of the main storage MS is stored in the communication buffer storage CBS when the copy of the content of the main storage MS as represented by the operand address calculated by the X2, B2 and D2 is not stored in the communication buffer storage CBS. This enables the copy of the data to be stored in advance from the main storage MS in the communication buffer storage CBS.

The foregoing embodiment is directed to such a computer system as having the communication buffer storage disposed between the main storage and the buffer storage of the scalar processor with the buffer storage. It is to be noted herein that the communication buffer storage which can allow only an operand of the particular instruction to be stored can likewise demonstrate useful functions as described hereinabove in the computer system having the scalar processor without any buffer storage disposed.

Figure 4:
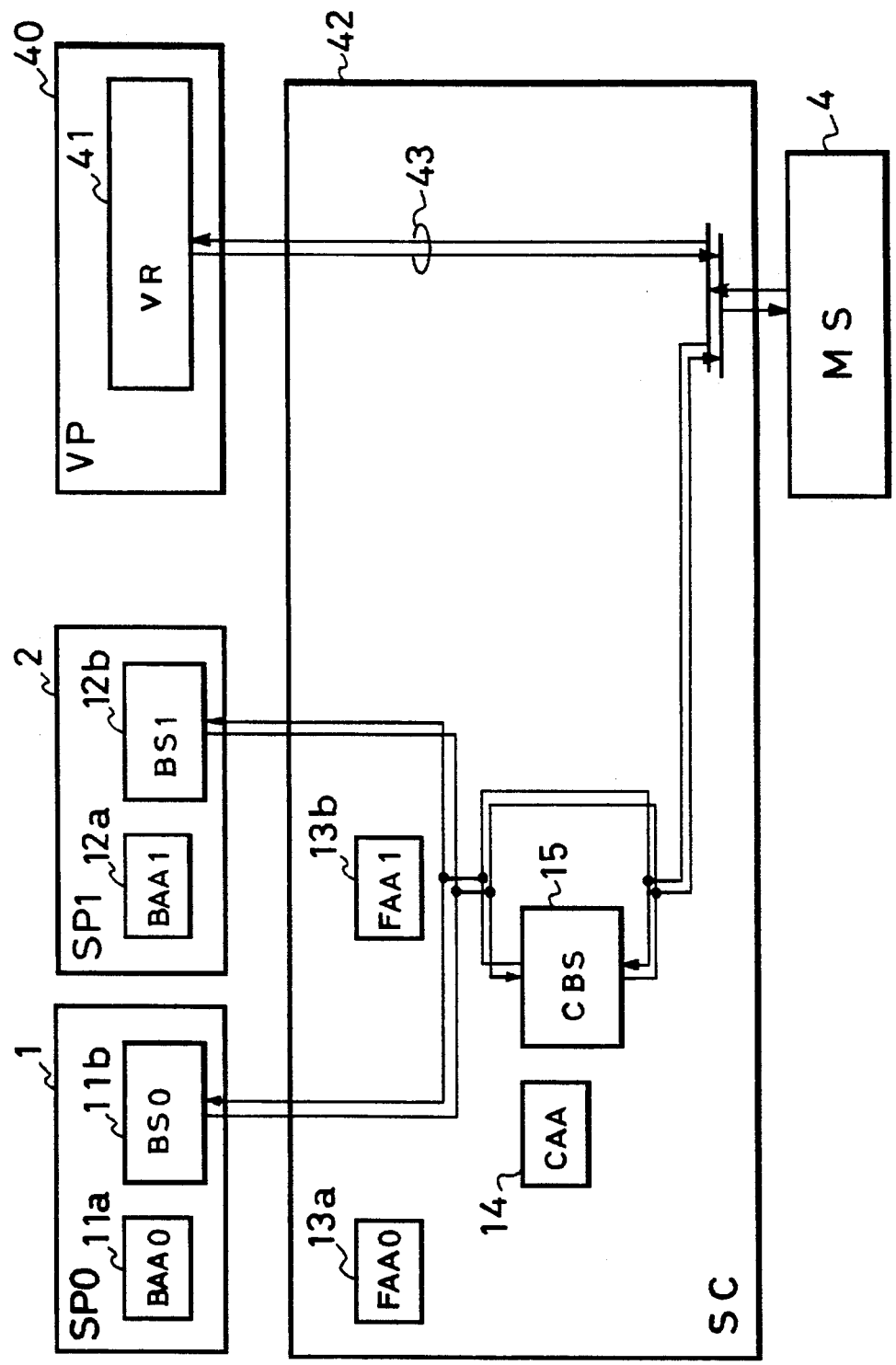
FIG. 4 is a block diagram showing the construction of a computer system according to a second embodiment of the present invention.

Description will now be made of other embodiments of the computer system according to the present invention. FIG. 4 is a block diagram showing the construction of the computer system in accordance with the second embodiment of the present invention, in which at least one of the plural processors is a vector processor, thereby comprising such a computer system as capable of implementing the vector processing with high efficiency.

As shown in FIG. 4, reference numeral 40 stands for a vector processor (VP), reference numeral 41 for a vector register (VR), and reference numeral 42 for a storage controller. The computer system of the second embodiment is of such a type as being generally called super computer, which can allow a data path 43 connected to the vector register VR 41 to be operated at an extremely high throughput. Therefore, such an intermediate buffer storage as making a time for turning the main storage MS around at a high speed look shorter cannot generally be employed because a large number of data is fed through the data path 43 at a high speed. As the data path 43 to the vector register VR 41 becomes high in throughput even if an intermediate buffer storage in an ordinary term would be disposed, the content of the intermediate buffer storage is caused to be replaced immediately by other contents, thereby eventually causing a frequent data transfer from the mains storage MS in order to maintain the content of the data in the intermediate buffer storage. Therefore, as a result, the turnaround time for making access to the data in the main storage MS looks so shorter that the computer system can shorten the time for fetching the operand data of such a particular instruction as utilizing an interlocking mechanism which should make access to the data itself in the main storage, such as the TS instruction, by disposing the communication buffer storage CBS 15 which can store the operand data of the aforesaid particular instruction alone.

In the second embodiment, too, such a particular instruction as the LCBS instruction for loading by using the communication buffer storage CBS as the access object or as the STCBS instruction for storing by using the communication buffer storage CBS as the access object is also valid as in the previous embodiment. By utilizing the communication buffer storage CBS, processing can be implemented without executing any useless invalidation yet without fetching in the buffer storage BS.

The foregoing description is directed to the embodiment of the computer system in which the communication buffer storage is interposed between the buffer storage of the scalar processor with the buffer storage and the main storage. It can be noted herein that the communication buffer storage which can store only the operand of a particular instruction can exhibit usefulness similar to that as described hereinabove in the computer system having the scalar processor without buffer storage, too.

Figure 5:
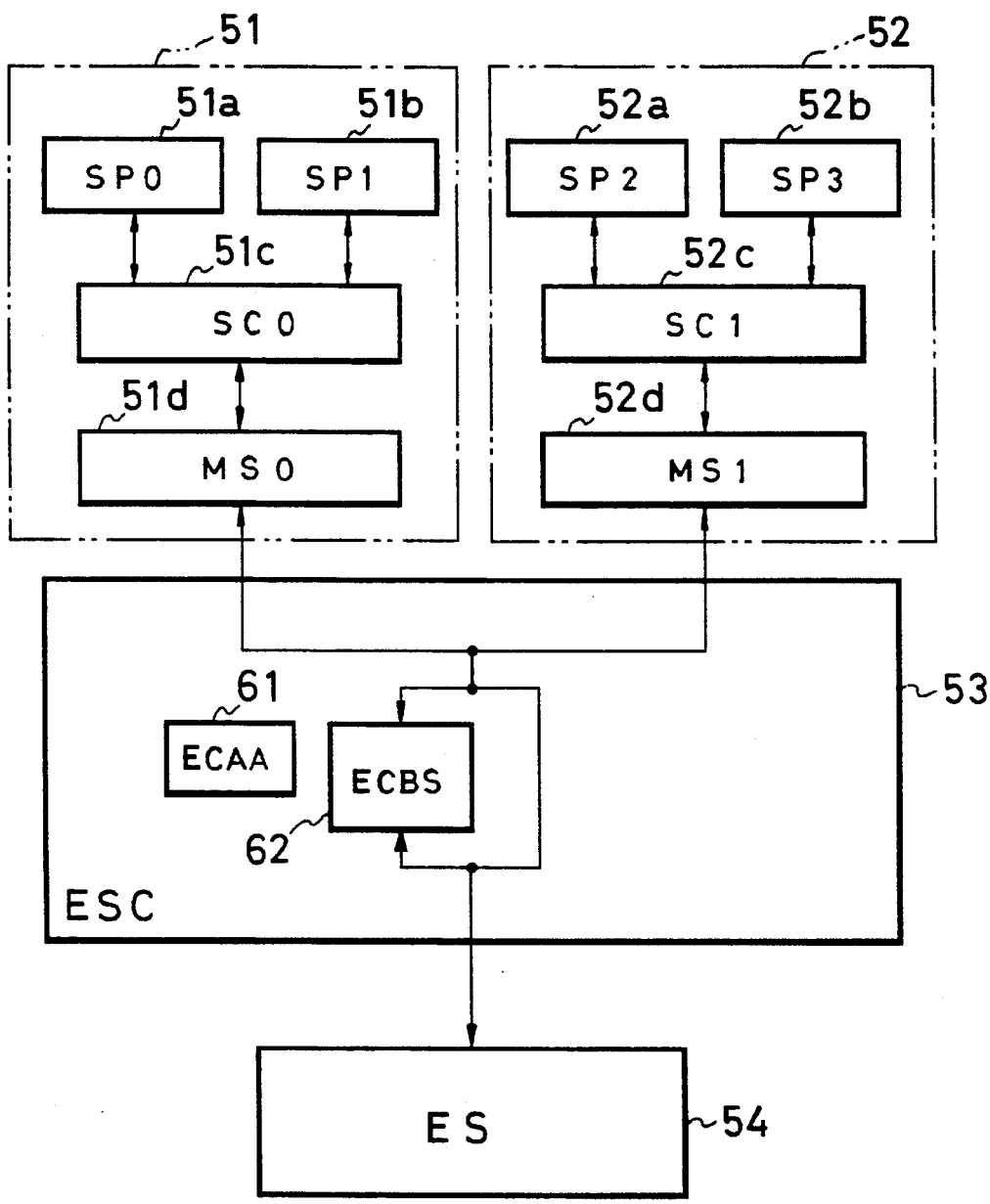
FIG. 5 is a block diagram showing the construction of a computer system according to a third embodiment of the present invention.

FIG. 5 is a block diagram showing the construction of the computer system in accordance with the third embodiment of the present invention, in which the construction of the computer system is so extended as to comprise a system construction having an extended storage which can provide the main storage with a further larger capacity of storage area. As plural processors constituting elements for structuring the computer system, each of the processors is so arranged as to correspond to a subsystem consisting of a tightly coupled multi-processor system. This system is of a system construction in which the communication buffer storage is disposed to the extended storage as a shared storage so as to implement data communication to an extended storage controller as a mechanism for implementing data communication between the processors (subsystems).

Description will be made of the computer system in the third embodiment of the present invention with reference to FIG. 5. As shown in FIG. 5, reference numeral 51 stands for a subsystem constituting a first tightly coupled multi-processor (TCMP), reference numeral 52 for a subsystem constituting a second tightly coupled multi-processor, reference numeral 53 for an extended storage controller (ESC), and reference numeral 54 for an extended storage (ES). The first subsystem 51 comprises plural tightly coupled scalar processors (SP0 and SP1) 51a and 51b, a storage controller (SC0) 51c, and a main storage 51d, while the second subsystem 52 comprises likewise plural scalar processors (SP2 and SP3) 52a and 52b, a storage controller (SC0) 52c, and a main storage 52d. The extended storage controller 53 comprises an extended-storage communication buffer storage (ECBS) 62 for storing a copy of a portion of the content of data of the extended storage, which can store an operand data of a particular extended storage instruction, and an extended-storage management table (ECAA) 61 for managing an address of data registered in the extended-storage communication buffer storage 62. In this computer system, the extended storage (EC) 54 is shared by the two subsystems 51 and 52 for the TCMPs through the extended storage controller 53.

The feature in the computer system of the third embodiment according to the present invention lies in the fact that a data unit to be transferred once by a data path connecting the main storage MS constituting the subsystem to the extended storage ES may be extremely large. Therefore, even if such a buffer storage as storing an operand data of a usual main storage/extended storage transfer instruction would be interposed between the main storage MS and the extended storage ES, the content of the buffer storage should be continued to be replaced by always implementing data transfer between the main storage MS and the extended storage ES if an amount of data exceeding its buffer capacity should be transferred, thereby achieving no such effect as disposing the buffer storage. On the other hand, however, a path connecting the main storage MS to the extended storage ES is employed in implementing the processing of such an update instruction as updating data by interlocking a connection between each of the subsystems of the TCMPs connected to each other through the extended storage ES, such as "Compare Double and Swap Extended Storage" instruction (CDSES instruction). In this case, the extended-storage communication buffer storage (ECBS) 62 is employed as a buffer storage for merely storing the operand data of such an instruction as being interlocked in the manner as described hereinabove, thereby shortening a turnaround time required for data fetching to a great extent.

In this embodiment as described hereinabove, such an instruction as a reference instruction for referencing data stored in the main storage itself, such as an instruction using an interlocking mechanism, and the instruction which has the access object to the communication buffer storage CBS disposed separately for the specific purpose, are to store the operand data only in the communication buffer storage CBS, not in the buffer storage BS in each processor. Therefore, as long as reference from the program is made by the restricted particular instruction as described hereinabove, access can be made from the communication buffer storage CBS located nearby without making access to the main storage MS, thereby increasing the speed to make access to data. Further, no fetching into the buffer storage is implemented so that no invalidation processing is required, thereby improving processing performance and efficiency of the computer system.

It is noted herein, however, that the communication buffer storage CBS may be small in physical quantity and does not raise costs because the store object is restricted only to an operand data of a particular instruction.

The instruction processing mechanism utilizing the communication buffer storage CBS disposed in the storage controller as described immediately hereinabove can particularly be utilized appropriately in the computer system which, like a super computer for implementing the vector processing, has plural processors including the vector and scalar processors yet is not provided with an intermediate buffer storage due to an extremely high throughput of the data path between the vector processor VP and the main storage MS. In other words, this mechanism has the effect of shortening the time for fetching the instruction operand functioning as the object of storing in the communication buffer storage CBS, such as a control instruction for the vector processing, by utilizing the communication buffer storage with the object restricted.

In such a system as receiving or delivering data between the subsystems of the TCMPs through the extended storage, one data transfer unit is so large that no buffer storage can be disposed yet the extended-storage communication buffer storage ECBS with its store object restricted can be disposed, thereby shortening the time for fetching the extended storage instruction operand functioning as the store object to the extended-storage communication buffer storage ECBS.

Description has been made hereinabove of the specific embodiments of the computer system according to the present invention, however, it should be noted that the present invention is not intended to be limited to those embodiments as described hereinabove and is understood to contain various variations and modifications that do not escape from the spirit and scope of the present invention.

The present invention can provide the computer system which can introduce the buffer storage which can solve the problems involved with the shared register shared by the plural processors into the computer system having the vector processor and as a result which can implement the vector processing with high efficiency. Further, the computer system having the plural processors including the vector processor yet having no intermediate buffer storage disposed in nature can process data communication between the processors at a high speed by providing the storage controller with the communication buffer storage with the store object restricted only to data to be transferred between the processors.

What is claimed is:

1. A computer system comprising:
   a plurality of processors including at least one scalar processor and at least one vector processor;
   a shared storage shared by the plurality of processors, and
   a storage controller having a communication buffer storage for storing a copy of a portion of data of the shared storage, the storage controller performing at least one of i) a send of an operand data of a vector instruction to be executed by the at least one vector processor from the shared storage directly to the at least one vector processor through a high throughput path and ii) a receive of said operand data thereof from the at least one vector processor, and, upon executing a particular synchronous instruction by the at least one scalar processor;

characterized in that said communication buffer storage stores only an operand data of said particular synchronous instruction among operand data of various data read instructions and data write instructions, the synchronous instruction used upon receipt or delivery of a shared variable data through the shared storage shared by the plurality of processors, and;

further characterized in that, upon executing the particular synchronous instruction by a first processor of the plurality of processors, the storage controller uses the operand data of said particular synchronous instruction when a request for said particular instruction is received from the first processor and the operand data of said particular synchronous instruction exits in the communication buffer storage, in a first situation, and copies a portion of data of the shared storage, which said portion is the operand data of the particular synchronous instruction, and stores a resulting copy in the communication buffer storage when the operand data of said particular synchronous instruction does not exist in the communication buffer storage, in a second situation.

2. A computer system comprising:

plural subsystems in which a plurality of processors are tightly coupled to each other through a shared storage and are classified into one group, the plurality of processors including at least one scalar processor and at least one vector processor;

a shared extended storage controller having an extended communication buffer storage disposed between the shared storage of each of the plural subsystems and a shared extended storage for storing a copy of a portion of data of the shared extended storage as an object for storing exclusively an operand data of a particular synchronous extended storage instruction;

characterized in that, upon executing the particular synchronous extended storage instruction in a first of the subsystems and storing the copy of the portion of the data of the extended storage in the shared storage, the extended storage controller uses the operand data of the particular synchronous extended storage instruction when said operand data exists in the extended communication buffer storage, in a first instance, and copies the portion of the data of the extended storage and stores the resulting copy of the portion thereof in the extended communication buffer storage when the said operand data does not exist in the extended communication buffer storage, in a second instance, and, upon executing an ordinary extended instruction that is not said particular synchronous extended storage instruction, the copy of the portion of the data of the extended storage is not stored in the extended communication buffer storage even if an operand data for said ordinary extended instruction does not exist in the extended communication buffer storage;

further characterized in that the storage controller performs at least one of i) a send an operand data of a vector instruction to be executed by a one of the plurality of vector processors from the shared storage directly to the first vector processor through a high throughput path and ii) a receive of said operand data thereof from the first vector processor, and, upon executing the particular synchronous instruction by a first of the scalar processors, the storage controller uses the operand data of said particular synchronous instruction when a request for said particular synchronous instruction is received from the first scalar processor, in the first instance, and copies the portion of data of the shared storage, which said portion is the operand data of the particular synchronous instruction, and stores the resulting copy thereof in the communication buffer storage when the operand data of said particular synchronous instruction does not exist in the communication buffer storage, in a second instance.

3. A storage controller of a computer system comprising:

a plurality of processors including at least one scalar processor and at least one vector processor, plural storages of a first layer employed by the plurality of processors, and a storage of a second layer shared by the plural storages of the first layer, wherein the storage controller is interposed between the storages of the first layer and the storage of the second layer and has a communication buffer storage for communication between the plural storages of the first layer for storing a copy of a portion of data of the storage of the second layer as an object for storing exclusively an operand data of a particular synchronous instruction for the storage of the second layer;

characterized in that the storage controller performs at least one of a send of an operand data of a vector instruction to be executed by the at least one vector processor from the shared storage directly to the at least one vector processor through a high throughput path and a receive of said operand data thereof from the at least one vector processor, and, upon executing the particular synchronous instruction by a first of the at least one scalar processors, the storage controller uses the operand data of said particular synchronous instruction when a request for said particular synchronous instruction is received from said plurality of processors, in a first instance, and copies the portion data of the shared storage, which said portion is the operand data of the particular synchronous instruction, and stores the resulting copy thereof in the communication buffer storage when the operand data of said particular synchronous instruction does not exist in the communication buffer storage, in a second instance;

further characterized in that, upon executing a particular synchronous instruction in the computer system and storing the copy of the portion of the data of the storage of the second layer in the storage of the first layer, said storage controller uses the operand data of the particular synchronous instruction when said operand data exists in the communication buffer storage, in a first instance, and copies the portion of the data of the storage of the second layer and stores the resulting copy of the portion thereof in the communication buffer storage when the said operand data does not exist in the communication buffer storage, in a second instance, and, upon executing an ordinary instruction that is not said particular synchronous instruction, the copy of the portion of the data of the extended storage is not stored in the communication buffer storage even when an operand data for said ordinary instruction does not exist in the communication buffer storage.

* * * * *